(12) United States Patent
Gurule et al.

(10) Patent No.: US 11,500,528 B2
(45) Date of Patent: Nov. 15, 2022

(54) SYSTEM ARCHITECTURE FOR COHORTING SENSOR DATA

(71) Applicant: Palantir Technologies Inc., Palo Alto, CA (US)

(72) Inventors: Myles Gurule, New York, NY (US); Amin Mannaa, New York, NY (US); Nabeel Qureshi, New York, NY (US); Arjun Prakash, New York, NY (US); Andrew Girvin, Bethesda, MD (US); Matthew Owens, New York, NY (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

(21) Appl. No.: 16/579,400

(22) Filed: Sep. 23, 2019

(65) Prior Publication Data

US 2021/0004147 A1 Jan. 7, 2021

Related U.S. Application Data

(60) Provisional application No. 62/869,424, filed on Jul. 1, 2019.

(51) Int. Cl.
*G06F 3/04847* (2022.01)
*G06F 9/451* (2018.01)

(52) U.S. Cl.
CPC .......... *G06F 3/04847* (2013.01); *G06F 9/451* (2018.02)

(58) Field of Classification Search
CPC ............................ G06F 3/04847; G06F 9/451
See application file for complete search history.

(56) References Cited

U.S. PATENT DOCUMENTS 8,315,805 B2 * 11/2012 Opalsky ................. G16B 20/20
702/19
8,812,960 B1 8/2014 Sun et al.
(Continued)

FOREIGN PATENT DOCUMENTS

CN 1942878 A * 4/2007 ............ G16B 5/00
CN 102132151 A * 7/2011 ............ G16C 20/90
(Continued)

OTHER PUBLICATIONS

Ziaur Rehman Tanoli et al., "Drug Target Commons 2.0: a community platform for systematic analysis of drug-target interaction profiles", available at https://academic.oup.com/database/article/doi/10.1093/database/bay083/5096727, Sep. 13, 2018 hereinafter Tanoli.*
(Continued)

*Primary Examiner* — Yongjia Pan
(74) *Attorney, Agent, or Firm* — Knobbe, Martens, Olson & Bear, LLP

(57) ABSTRACT

A method of cohorting data sets can include accessing a plurality of data sets each associated with a different target item and a plurality of test items and receiving from a user a selection of a plurality of the data sets. For each of the selected data sets, the method may include determining one or more of the test items interacting with the respective target within a threshold parameter and identifying one or more matching test items of the plurality of test items associated with interactions with each of the targets of the selected data sets. The method can include generating a graphical user interface to display a representation of the matching test items, the selected data sets, or both and receiving a filter selection for reducing a number of the matching test items to a filtered one or more test items smaller than the number of matching test items.

19 Claims, 10 Drawing Sheets

(56) References Cited

U.S. PATENT DOCUMENTS

| | | | |
|---|---|---|---|
| 9,367,812 B2 * | 6/2016 | Segall | G16C 20/30 |
| 9,757,706 B2 * | 9/2017 | Cronin | G06N 3/126 |
| 2003/0033091 A1 * | 2/2003 | Opalsky | G16B 50/20 702/20 |
| 2005/0130192 A1 * | 6/2005 | Paterson | G16B 20/00 435/6.16 |
| 2009/0209759 A1 * | 8/2009 | Warrington | G16B 15/30 544/297 |
| 2011/0172931 A1 * | 7/2011 | Murthy | G16C 20/20 702/32 |
| 2012/0166789 A1 * | 6/2012 | Baxi | G06F 13/385 713/100 |
| 2012/0283956 A1 * | 11/2012 | Ruppin | G06F 17/11 702/19 |
| 2016/0310077 A1 * | 10/2016 | Hunter | A61B 5/0024 |
| 2017/0103183 A1 * | 4/2017 | Flobak | C08F 8/34 |
| 2017/0193157 A1 * | 7/2017 | Quirk | G16B 35/00 |
| 2018/0068089 A1 * | 3/2018 | Hu | G06N 5/00 |
| 2019/0187164 A1 * | 6/2019 | Fukaya | G06F 16/248 |
| 2019/0252036 A1 * | 8/2019 | Elemento | G16C 20/30 |
| 2021/0233620 A1 * | 7/2021 | Cronin | G16C 20/10 |

FOREIGN PATENT DOCUMENTS

| | | | | |
|---|---|---|---|---|
| CN | 102768512 B | * | 2/2015 | ......... G05B 19/4183 |
| CN | 109856230 A | * | 6/2019 | |
| CN | 110300980 A | * | 10/2019 | ............. G06Q 10/00 |
| EP | 1877874 A2 | * | 1/2008 | ............. G06Q 10/06 |
| EP | 3761189 | | 1/2021 | |
| WO | WO2001075625 A1 | * | 10/2001 | |
| WO | WO 2010/022391 | | 2/2010 | |

OTHER PUBLICATIONS

Tapio Pahikkala et al., "Toward more relistic drug-target interaction predictions", available at https://www.ncbi.nlm.nih.gov/pmc/articles/PMC4364066/, Apr. 9, 2014.*

Jose F Rodrigues Jr, Larisa Florea, Maria C F de Oliveira, Dermot Diamond, Osvaldo N Oliveira Jr, A survey on Big Data and Machine Learning for Chemistry, Apr. 23, 2019, 48 pages (Year: 2019).*

Bauch et al., BIS: a flexible framework for managing and analyzing complex data in biology research, 2011, 19 pages (Year: 2011).*

Official Communication for European Patent Application No. 20183170.8 dated Nov. 19, 2020, 11 pages.

* cited by examiner

BUILD YOUR EXPERIMENT SET
Specify experiments and apply filters to produce sets of experiment results. Histogram values are approximate.

SELECT EXPERIMENTS / PROTOCOLS

204

FILTER DRUG RESPONSES
Select a region of the chart to set a filter. Repeat to apply multiple filters.

| Cell Line | AUC | LAC50 | CClass2 | IC50 | MaxR | Sample D... | Efficacy |
|---|---|---|---|---|---|---|---|

208

Clear filters drug responses match the current filters.
Current filters: none

212

COUNT / LAC50

Add Experiments  ▸ Finished Selecting Expressions

FIG. 2

NEW COMPOUND SET

∞ SET MATH

Define a new compound set using combinatoric logic

| Name | 206 Count |
|---|---|
| ☑ Compounds from Data Set 1 | 1677 |
| ☑ Compounds from Data Set 2 | 622 |

246

▽ FILTER COMPOUND SET

Define a new compound set filtered by mechanism of action.

250

Intersecting Compounds from Data Set 1 and Data Set 2

- Set 0: Compounds from Data Set 1
- Set 1: Compounds from Data Set 2

Compounds in new set: 577

Name Your Compound Set*

Actives to follow up on|

Save

FIG. 5

ANALYZE COPOUND SETS
Explore compounds used in your experiment sets  ✎ View hierarchical cluster diagram to inform compound sets

COMPOUND SETS

| Name | Count |
|---|---|
| Compounds from Data Set 1 | 1677 |
| Compounds from Data Set 2 | 622 |
| Actives to follow up on | 577 |

232 ⎯ 258, 258

[Search for a compound...]   ↗ See all

| | Name | Structure (chembl) | Phase | NCGC IDs | Gene Targets | MOAs |
|---|---|---|---|---|---|---|
| ☑ | 🔗 Mycophenolate mofetil | CHEMBL1456<br>CHEMBL1200955<br>CHEMBL3210645 | Approved.<br>Unknown | NCGC00159459 | IMPOH2<br>IMPOH1<br>HCAR2 | Inosine 5-monophosp Inhibitor,Inosine 5-me Dehydrogenase (impdh) Hydroxycarboxytic Acid Inosine-monophospha (impdh) Inhibitors |
| ☐ | 🔗 SB-525334 | CHEMBL401570 | Preclinical<br>Unknown | NCGC00186024<br>NCGC00261399 | TGFBR1.<br>TGBR1 | Tgf-beta Receptor (alk5) Inhibitor |

SYSTEM ARCHITECTURE FOR COHORTING SENSOR DATA

INCORPORATION BY REFERENCE TO ANY PRIORITY APPLICATIONS

This application claims benefit of U.S. Provisional Patent Application No. 62/869,424, entitled "SYSTEM ARCHITECTURE FOR COHORTING SENSOR DATA," filed Jul. 1, 2019, which is hereby incorporated by reference in its entirety.

Any and all applications for which a foreign or domestic priority claim is identified in the Application Data Sheet as filed with the present application are hereby incorporated by reference under 37 CFR 1.57.

BACKGROUND

Field

The present disclosure relates to user interfaces for visualizing and analyzing sensor data.

Description of the Related Art

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Software architectures can be used to organize information. However, some inadequacies exist in current architectures. Raw data may be obtained and stored in a database. The raw data may be obtained from a scientific experiment, an industrial process, or from some other type of sensors. The data may be disorganized or unclear to a user and/or a computer (e.g., in a machine learning environment). The data may be associated with various data objects, and the data objects may include various properties associated with the object. For example, one data object may include experimental results from a scientific investigation of health responses across various concentrations of a medicament. The data object may be linked to other objects, such as a chart or graph that partially organizes the experimental results. However, this data may be unconnected to other relevant data objects, such as gene profiles associated with the medicament.

BRIEF DESCRIPTION OF THE DRAWINGS

FIG. 2 shows an example graphical user interface for interacting with and/or manipulating information from the experimental data store, which may include one or more data sets according to one embodiment.

FIG. 5 shows an aspect of an example graphical user interface that allows a user to cohort two or more data sets according to one embodiment.

FIG. 7 shows another aspect of an example graphical user interface that allows a user to see a detail view of one or more aspects of a selected characteristic according to one embodiment.

DETAILED DESCRIPTION

Terms

Figure 1:
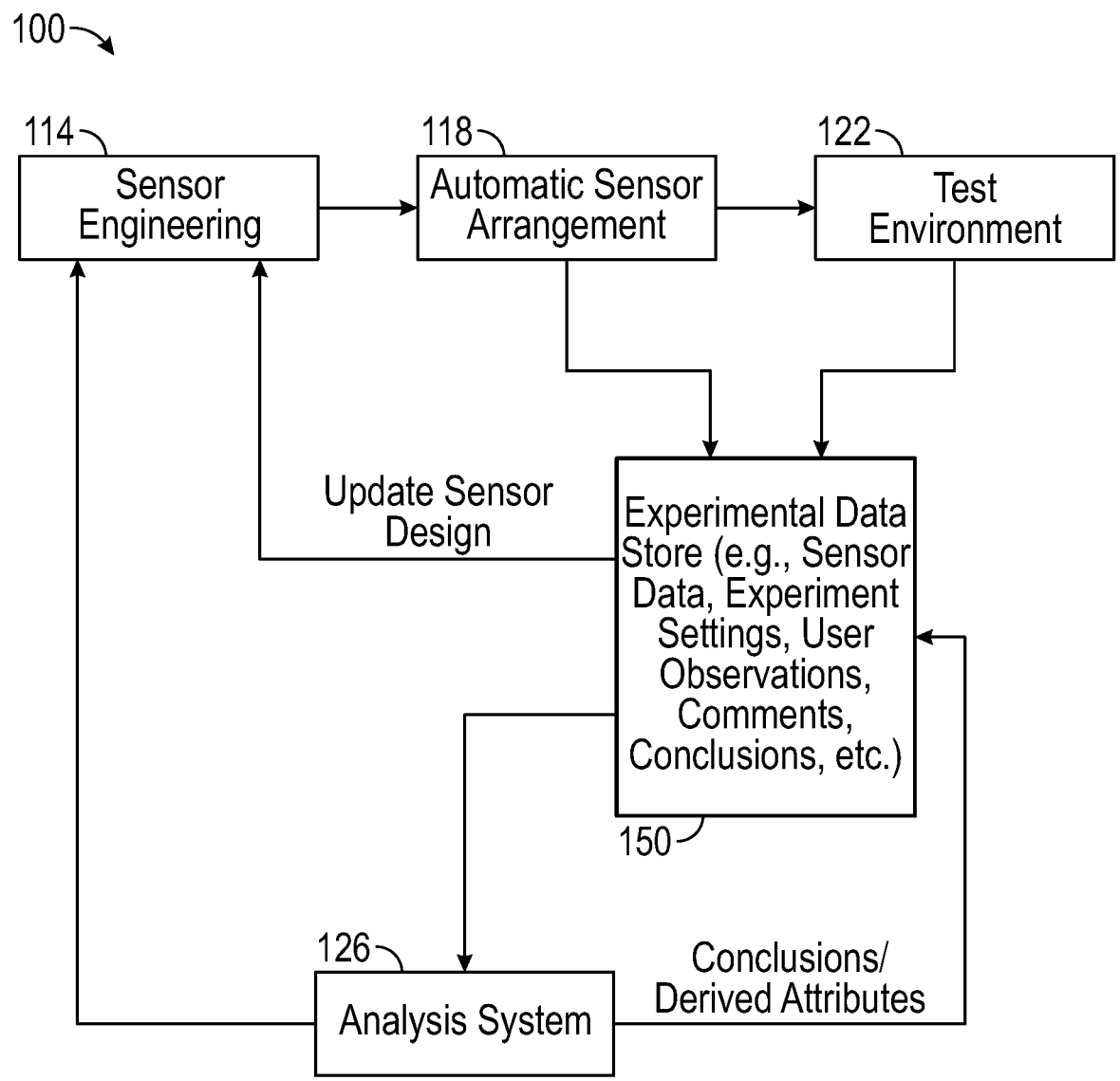
FIG. 1 is a data flow diagram showing one embodiment of an example system setup including an analysis system in communication with various other devices and systems.

In order to facilitate an understanding of the systems and methods discussed herein, a number of terms are described below. The terms described below, as well as other terms used herein, should be construed to include the provided descriptions, the ordinary and customary meaning of the terms, and/or any other implied meaning for the respective terms. Thus, the descriptions below do not limit the meaning of these terms, but only provide exemplary descriptions.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid-state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage). However, the hosted storage environment may additionally or alternatively be located on the client computing device.

Database: Any data structure (and/or combinations of multiple data structures) for storing and/or organizing data, including, but not limited to, relational databases (e.g., Oracle databases, PostgreSQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Data Object or Object: A data container for information representing specific things in the world that have a number of definable properties. For example, a data object can represent an entity such as a physical object, a parcel of land or other real property, a market instrument, a policy or contract, or other noun. Each data object may be associated with a unique identifier that uniquely identifies the data object. The object's attributes (e.g. metadata about the object) may be represented in one or more properties. Attributes may include, for example, a geographic location associated with the object, a value associated with the object, a probability associated with the object, an event associated with the object, and so forth.

Test Item: Any object that can be sensed using a sensor and/or an object that causes or experiences a chemical reaction with matter.

Overview

Reference will now be made in detail to example embodiments, the examples of which are illustrated in the accompanying drawings. Whenever possible, the same reference numbers will be used throughout the drawings to refer to the same or like parts.

Raw data may be obtained and stored in a database. The raw data may be obtained from a scientific experiment, an industrial process, or from some other type of sensors. The data may be disorganized or unclear to a human user. The data may be associated with various data objects (e.g., discrete results of an experiment), and the data objects may include various properties associated with each object. A results data set may include a plurality of data objects. For example, one data object may include experimental results from an assay plate measurement of various concentrations of the efficacy of a compound in various cell lines. A second data object may include similar results from a second assay plate. Each assay plate may correspond, for example, to a target (e.g., cells, cell lines) from a different source. For example, a compound library may be tested against cancer cells from multiple different sources in multiple experiments. Results of these multiple experiments (or other sensor data) may be viewed individually, but there is not an automated mechanism and user interface for comparing results of multiple experiments, such as by allowing a user to cohort experiment results. For example, there is a need for improved systems and user interfaces that identify certain test items (e.g., reactive compounds) that qualify as "hits" in each of the multiple experiments, which aids the user in developing conclusions regarding the experiments and/or further more focused experiments. Metadata associated with the hits may be automatically derived and/or displayed based on properties of the hits and the cohorting of the test items. Such problems are not restricted to scientific data or experimental results but may be found in any context where linkages among observations and objects related to the observations may be made. "Cohorting" may refer generally to automated and/or manual processes of identifying groups of items, such as based on relationships among those items. For example, cohorting may refer to finding a cross section of test items (e.g., chemical compounds in a compound library used across a series of experiments) that have interacted with multiple targets (e.g., cell lines used in the series of experiments).

A user interface can allow for object-based interactions with sensor data, such as high-throughput screening data. Sets of sensor data (e.g., High-Throughput Screening (HTS) results for different targets) may be stored as data objects. The system provides software and interactive user interfaces that allow various cohorting operations to be performed on data objects. For example, a user may select multiple data objects (e.g., multiple sets of HTS results, each for a different target) and the system identifies "hits" that are common across each of the data objects. Thus, in the case where the targets are each of the same pathology, the user is provided with a listing of compounds that are effective across each of the multiple experiments. These hits may be used to aid the user in drawing conclusions about effectiveness of the compounds, for example, and/or in developing further more focused experiments. For example, the system can identify for a user (e.g., a scientist) those certain compounds that are effective for a plurality of experimental sets, such as cells or cell lines. A user can apply one or more filters to support the identification of metadata of the one or more compounds. The user interface can also allow for the linking of otherwise disconnected data objects and/or their associated properties. The linking can be based on a user selection or limitation or it may be made automatically using a software algorithm. A link can be made between the data object that includes the experimental results of the assay measurement and the data object that includes the gene profiles.

The present disclosure describes various embodiments of an analysis system that interacts with a user, such as via graphical user interfaces, to perform a workflow that addresses one or more of the above-referenced challenges. According to an embodiment, a computer-implemented method for determining a cohort among a plurality of data sets obtained from one or more sensors can include accessing a plurality of data sets (e.g., experimental output data) each associated with a different target item (e.g., cancer cell line) and a plurality of test items (e.g., chemical compounds). The method may include receiving from a user a selection of a plurality of the data sets and, for each of the selected data sets, determining one or more of the test items interacting with the respective target within a threshold parameter. The method may include identifying one or more matching test items of the plurality of test items associated with interactions with each of the targets of the selected data sets. The method includes generating a graphical user interface to display a representation of the matching test items and/or the selected data sets and receiving, via the graphical user interface, a filter selection for reducing a number of the matching test items to a filtered one or more test items smaller than the number of matching test items. The method may include identifying a characteristic (e.g., method of action, gene targets, name, structure, phase, etc.) of the filtered test items. The method may include passing, based on the characteristic, the filtered test items, the characteristic, or both to a computer in communication with the one or more sensors for producing a new data set.

For example, in reviewing data on a study on the effects of various dosages of medicament on a living tissue, a user may choose to limit the results of a sensor from a scientific experiment related to doses of medicament to include only high dosages (e.g., a range of dosages). Additionally or alternatively, the user could select a type of medicament, a group of treatment specimens, or any other relevant feature of the sensor data. Based on the selection, the user may be better able to identify a trend or pattern in the results. The user may choose to have the data visualized in an existing or new object, such as a graph, a chart, a plot, or any other type of visualization.

As described in further detail below, various alternative implementations of the present disclosure may include additional or fewer characteristics from those described above.

Example Linking Architectures and User Interfaces

To provide a framework for the following discussion of specific systems and methods described herein, an example system setup 100 will now be described with reference to FIG. 1. This description is provided for the purpose of providing an example and is not intended to limit the techniques to the example system architecture.

FIG. 1 is a data flow diagram showing one embodiment of an example system setup 100 including an analysis system 126 in communication with various other devices and systems. As shown in FIG. 1, the system setup 100 can include sensor engineering 114, an automatic sensor arrangement 118, experimental data store 150, and input from a user such as a researcher (e.g., biologist, medical researcher, etc.), manager, or informatician via a user device that may be part of the analysis system 126. The experimental data store 150 can include any measurements or results taken from one or more sensors. The experimental data store 150 can additionally or alternatively include any other experimental and/or derived data, such as data obtained from running chemical and/or biological assays (e.g., the effect of a chemical compound on living cells). The sensors may include any type of sensor, such as thermal readings, optical readings, weight or mass measurements, concentration measurements, reaction results (e.g., chemical reactions with reagents, medical investigation results, etc.), photographic imagery, motion detection, or any other type of measurable or sensory data. The experimental data store 150 can be stored as a data set in a computer data store (e.g., long-term storage), such as according to an object model that defines how data objects and relationships between those objects are stored.

The experimental data store 150 may be accessed by a user via the analysis system 126 to inform a design of further sensory data collection, draw conclusions from the experimental data store 150, and/or communicate findings with the sensor engineering 114 and/or the test environment 122. The sensor engineering 114, which may include a user and/or a sensor arrangement computing system, may generate setup parameters of a scientific experiment, a user collection of personal information, an industrial measurement project, or any other design of a group of sensors, such as based on data stored in the experimental data store 150. For example, a biologist may use the data from the experimental data store 150 and, perhaps in conjunction with another individual (e.g., an experiment engineer), determine a sensor configuration and/or other experiment settings, to collect data according to certain configurations. For example, an experiment configuration may include a time of day, month, or year; the duration; the rate of collection; the arrangement of the data; the storage technique; a dosage; a combination of test items and target(s); and/or any other feature of the project, each of the configuration settings being determined manually and/or automatically.

The analysis system 126 is configured to execute software to perform the various methods discussed herein. The analysis system may comprise a single computing device, or multiple computing devices. For example, the analysis system may comprise a server that executes software that analyzes data in the experimental data store 150, and is in communication with one or more user devices that provide user interfaces that allow a user to interface with the data, such as those user interfaces discussed below with reference to the drawings. In some embodiments, the functionality of the analysis system 126 may be distributed to one or more devices. For example, in some embodiments a user device may generate user interface data based on data received from a server of the analysis system 126.

In the embodiment of FIG. 1, the analysis system 126 is in communication with sensor engineering 114, such as to provide instructions to modify the test environment 122 via the automatic sensor arrangement 118, which may include multiple sensors and/or other devices. In some embodiments, the components of the test environment 122 are calibrated based on the determined configuration settings, which may be accomplished by robotic (automated) actions of a non-human and/or by human actions of the automatic sensor arrangement 118. Once the sensors have been arranged and the settings of them have been identified, a computer may be used to automate the collection of the additional data. The system can be configured to automatically continue the data collection and/or update of the experiment configuration until it receives a stopping command by a user or until a predetermined outcome is reached. For example, in an experiment on the effects of a concentration of certain molecules in the atmosphere on weather patterns, the sensors could be configured to continue to measure the concentrations for a long enough period to provide statistically significant data to an informatician. In the HTS context, results of cohorting and/or filtering of experimental data may be analyzed by the analysis system 126 and/or the sensor engineering 114 to automatically determine, for example, which chemical compounds and/or targets to include in subsequent experiments.

Sensor data stored in the experimental data store 150 can be stored and linked in a manageable and intuitive fashion for a user. The automatic sensor arrangement 118 may be stored in the experimental data store 150 and used to inform the setup of the sensor engineering 114, such as a future experiment. For example, the experimental data store 150 may include data indicating results or conclusions that will benefit or even necessitate an update or modification to the sensor engineering 114 and/or experiment configuration. With regard to the HTS example above, once the user has analyzed experimental data, such as from multiple experiments and applied desired cohorting and/or filtering, the analysis system 126 can allow the user to update a future experiment configuration for collection of additional assay results. In the context of tracking concentration of certain molecules, once the sensors have provided the finished data into the sensor data, a user (e.g., scientist, experiment designer/engineer, statistician) may update the experimental setup to have the sensors track an additional variable (e.g., temperature of the air, a concentration of a separate molecule, a clarity in the air) as the experiment (e.g., assay measurements) continues to run. Thus, the data collected from the sensors and input into the experimental data store 150 may provide feedback for updating and improving the experiment configuration. While the system setup 100 can be configured to allow a user to update the sensor engineering 114, in some embodiments, the sensor engineering 114 may be updated automatically by a computer. For example, a machine learning algorithm may derive certain conclusions from the experimental data store 150 and, based on those conclusions, update the experimental setup of the sensors.

In some embodiments, a user may directly manipulate data stored in the experimental data store 150, such as by adding, removing, and/or adjusting a link between or among data objects. The changes made by the user via a user device of the analysis system 126 so that they appear instantaneous or nearly instantaneous for other users of the experimental data store 150. Users such as scientists (e.g., biologists, computer scientists, psychologists, etc.), system managers, mathematicians (e.g., statisticians, theorists), industrial experts, sensor experts, or other experts may have access to the experimental data store 150 and may be able to provide the same functionality in addition to or alternative to the analysis system 126 described herein.

The data stored in the experimental data store 150 may be stored in a data structure (e.g., a database) accessible by a network, such as over the Internet. The data can be stored such that the data may be viewed in a local or proprietary display software, such as an enterprise data platform. In certain embodiments, access is limited only to an internal network (e.g., an intranet) so that the data objects and/or the properties of the objects remain confidential within the network. Thus, the system setup 100 may be configured to prevent unauthorized access to the experimental data store 150 and/or other elements of the system setup 100. Metadata associated with the data objects and/or the associated properties may be made public, limited public (e.g., to within members the network), limited access based on credentials, or fully secure (e.g., only accessible to a system administrator), depending on the circumstances. The metadata may include a time of creation, information related to the author of the new object/properties (e.g., name, credentials, identifying information, etc.), a location (e.g., MAC address) of an author, history of edits or additions to the experimental data store 150, etc.

FIG. 2 shows an example graphical user interface 200 for interacting with and/or manipulating information from the experimental data store 150, such as the one or more data sets according to one embodiment. In one embodiment, the analysis system 126 analyzes data from that experimental data store 150 and/or other data to provide the graphical user interface 200, which may be rendered on a user device of the analysis system 126 of FIG. 1. In other embodiments, other computing devices may perform some or all of the data analysis and user interaction processes discussed herein.

In the example graphical user interface 200, a data set selector 204 allow a user to select one or more desired data sets to analyze. The graphical user interface 200 can further include one or more measurement metric selectors 208 that determine how data of the selected data sets is represented in visualization of the data. In one embodiment, the visualization of the data is provided in a filter interface 212 that is responsive to user inputs that allow filtering of the data based on interactions of the user with the visualization, such as is discussed further below.

The data set selector 204 can allow a user to input identifiers of one or more data sets for analysis. The data sets may be input using one or more input devices (e.g., keyboard, mouse, body gestures, etc.). Once selected, a representation of the one or more data sets can be visualized in the filter interface 212. For example, a data set may be represented as a bar chart, a pie chart, a histogram, a line graph, a box and whiskers plot, and/or some other representation. The representation may indicate how a plurality of test items (e.g., chemical compounds, energy inputs, etc.) responded to, for example, one or more target items (e.g., cancer cell lines, reactive chemicals, another material, etc.). Test items that exhibit a desired reaction in the presence of a target item are generally referred to as "hits." Thus, in a HTS example, hits can include compounds that cause a desired reactivity by a target cell line (e.g., compounds that kill a target cancer cell). Hits can be determined based on a threshold interaction of a test item (e.g., compound) with a target item (e.g., a cancer cell line). For example, a hit may refer to a compound that has killed a cancer cell and/or prevented its reproduction. Other interactions between chemical compounds and organic material are possible. The relationship of the hits and/or non-hits may be stored as one or more data sets, such as in the experimental data store 150, for analysis by a scientist, informatician, or other user.

The measurement metric selectors 208 can allow a user to select a type of representation and/or one or more variables to be represented in the filter interface 212. As shown, for example, the measurement metric selectors 208 can allow a user to select one or more measurement metric including: cell line, AUC (area under a curve), LAC50 (half maximal activity (log) concentration), CClass2, IC50 (concentration giving a response half way between the fitted top and bottom of the curve), MaxR (percent viability at the maximum concentration of compound tested), sample type, efficacy, and/or other features not shown. A user can change the visualization in the filter interface 212 by selecting another measurement metrics selector 208.

Figure 3:
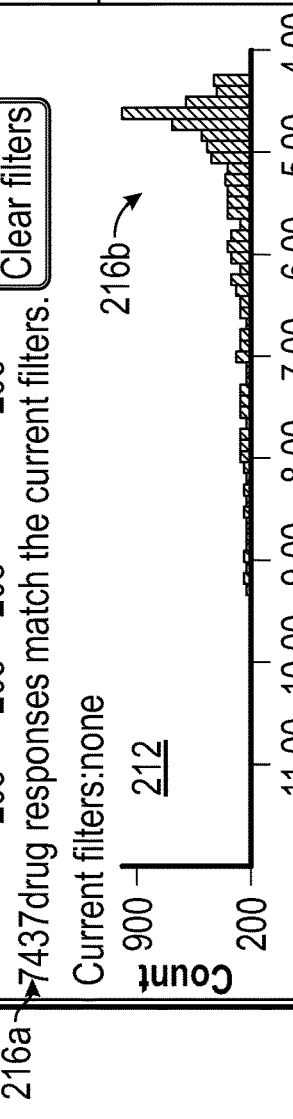
FIG. 3 shows another aspect of an example graphical user interface according to one embodiment.

FIG. 3 shows another aspect of the example graphical user interface 200, now with a measurement metric selected. As shown, a user has already included two data sets as identified by the data set indicators 206. With the LAC50 measurement metric 208a selected, the filter interface 212 is updated to indicate a number of test items, such as a particular drug response, included in the selected data sets. In particular, a results count 216a (e.g., in text) indicates a total of 7,437 test items (e.g., compounds) and a visualization 216b is a histogram indicating distribution of the 7,437 test items across values of the LAC50 measurement metric. If the user were to select another measurement metric, the results count 216a would remain the same, but the visualization 216b would be updated to indicate distribution of that newly selected measurement metric across corresponding range of values for that measurement metric. In some embodiments, other visualizations may be provided, rather than or in addition to, a histogram.

With a measurement metric selected, such as measurement metric 218a associated with LAC50, the visualization is updated to show a histogram of LAC50 values across the two selected data sets in FIG. 3. A user can identify clustering and/or other trends in the responses of the test items on the targets using the visualization 216b in the filter interface 212. As shown, for example, a peak count of reactivity of the target to the test items in the data sets appears to be around −4.8 LAC50. The data set indicators 206 can also be associated with corresponding filter data indicators and/or response counts to provide a user with additional information in analyzing the filters and/or data sets. For example, a user may be able to set (e.g., by zooming, by panning) a range of values of review within the filter interface 212.

Figure 4:
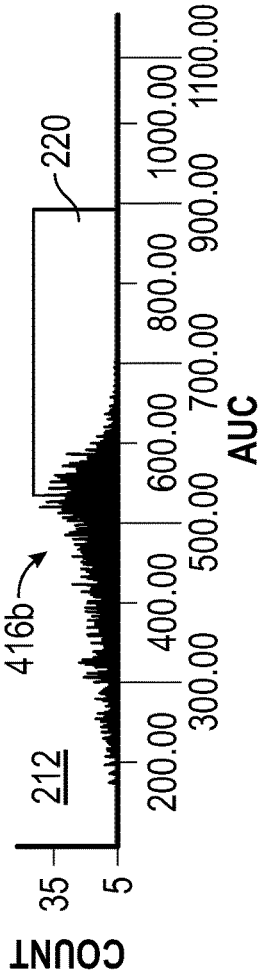
FIG. 4 shows the graphical user interface according to one embodiment with a measurement metrics selected test items within the selected data sets are displayed.

FIG. 4 shows a user interface 400 with the measurement metric 208b selected so that the visualization 416 illustrates test items within the selected data sets with reference to AUC measurements. The filter interface 212 allows the user to filter the test items based on a range of AUC values through interactions with the visualization 416b. In particular, the user may select a subgroup of the results displayed in the histogram visualization 416b by dragging an input selector across a desired range of the visualization 416b, for example. A filter selector 220 may then be displayed to indicate the selected filter range provided by the user input. In this embodiment, a results count 416a indicates that with the selected filter based on AUC measurements applied, there remains 2,369 test items within the selected data sets. In the embodiment shown, a range indicator 224 shows that the range of values selected by the filter selector 220 runs from about 511.93 to about 872.43 AUC. The range indicator 224 can be modified based on additional filter selections (e.g., applied to additional measurement metrics). In some embodiments, the filter selector 220 may be further adjusted, such as by dragging and moving ends of the filter selector 220, to adjust the value range for filtering results based on AUC measurements. Through use of such filtering, a user may more easily identify test items of interest, such as those test items that exhibit a desired level of reactivity to a target (e.g., compounds that kill a target cancer). In some embodiments, selection of a filtered range may be implemented using any input device and/or may be implemented by clicking on, selecting, surrounding, and/or otherwise capturing at least a portion of the visualization 416b for further analysis.

In one embodiment, with a first filter applied (e.g., based on the selected AUC measurements in FIG. 4), the user may select another measurement metric and apply a further filter to the data sets. For example, the user may select the IC50 measurement metric 208c to cause reconfiguration of the visualization 416 to illustrate the currently matching 2,369 test items according to their corresponding IC50 measurement metrics. The user may then select a portion of the IC50 histogram to filter the test items to include only those having the filtered IC50 values, such as to a filtered result set of less than 2,369. Any number of additional filters, based on any other measurement metrics, can be added in this manner, such as to further reduce the filtered test items.

FIG. 5 shows an aspect of an example graphical user interface 500 that allows a user to cohort test items of two or more data sets, including filtered test items of those data sets. Using the cohorting feature, a user can identify a set of test items that are more likely to be efficacious and/or worth researching more deeply. By selecting a button or other selector, a user can choose from one or more analysis type selectors 246. As shown, a "set math" selector is selected. Using the "set math" selector, a user can select two or more data sets using the corresponding data set indicators 206. Once selected, a visual representation of a cohorting of the two or more data sets can be displayed and manipulated within a matching test items analysis interface 250. As shown, each of data set indicators 510, 520 is represented in the matching test items analysis interface 250 as a Venn diagram with circles showing an overlapping or common matching test items indicator 254. For example, in the context of an HTS system, the Venn diagram may indicate in overlapping portion 254 which drugs were reactive with (e.g., killed) cancer tissue in each of the two selected experiments. The system can automatically identify the matching test items to include in the overlapping portion 254 based on the selection of data sets by the user. The user may select the matching test items indicator 254 and create a new corresponding data set, such as by using the matching test items results indicator 256. For example, the user may name and/or save the new data set that includes the matching test items for further analysis and/or further experimentation. The number of matching test items in each data set are displayed in the Venn diagram, which represents the first data set 510, the second data set 520, and the overlapping test items indicator 254.

In some implementations, the graphical user interface 500 can allow a user to analyze a newly created and/or cohorted data set. For example, the matching test items indicator 254 can indicate a number of "hits" associated with the one or more targets of the new data set. As in FIG. 6 below, a test items analysis interface 240 can include a histogram or other visual indicator of the number of hits within a data set, such as a cohorted data set created from the matching text item indicator 254, to indicate relative to the total number of test items in all of the data sets from which the new data set was cohorted. For example, one or more selected test items results indicators 234 can indicate to a user a test item characteristic. The test item characteristic associated with the hits can be optionally selected by the user using the test item characteristic selector 230. The test item characteristic selector 230 can include a variety of optional categories of characteristics, such as those described below with respect to FIG. 6.

Figure 6:
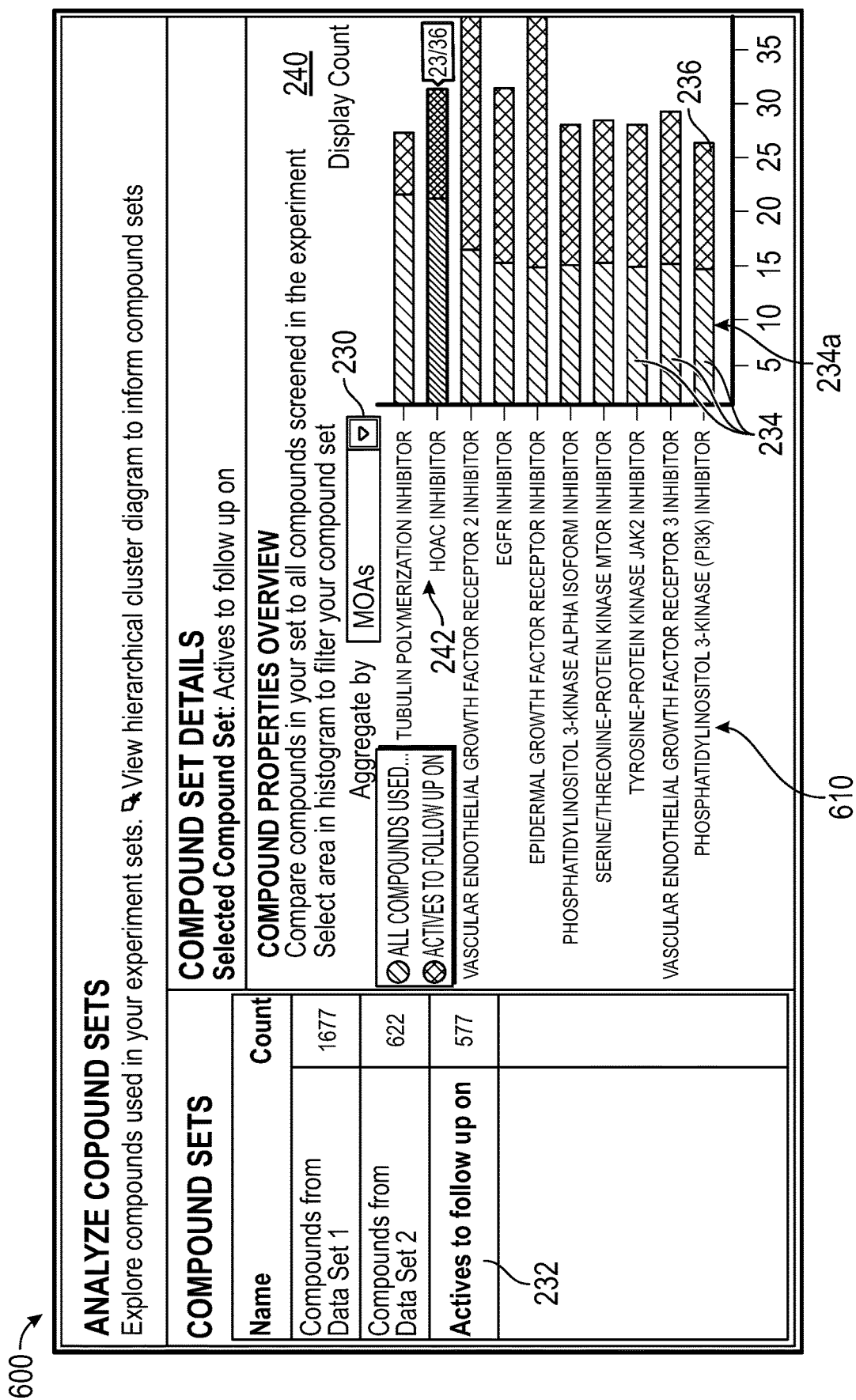
FIG. 6 shows how a user can select a specific category of characteristic, which is indicated by the selected characteristic-based test results indicator according to one embodiment.

FIG. 6 shows an example user interface 600 how a user can select a specific category of characteristic by which a selected data set is compared with all data items of one or more selected data sets. For example, multiple modes of actions for an experiment may each be indicated along with a comparison of how many of the test items in a selected data set (e.g., a cohorted data set) and how many of all the test items are associated with each mode of action. In the embodiment of FIG. 6, the selected data set indicator 232 indicates which data set(s) and/or test items are being analyzed within the test items analysis interface 240, such as by a bolding, a highlighting, or a difference in color. As shown, the selected data set indicator 232 bolds the data set that is selected. The test items analysis interface 240 can include a bar chart, line chart, histogram, or other visual indicator of the number of hits within the selected test items relative to the total number of test items in the one or more data sets. For example, one or more test items results indicators 234 can indicate test item counts for each of multiple characteristics within a category of characteristics. The test item characteristic category can be selected by the user using a test item characteristic selector 230. The test item characteristic selector 230 can include a variety of optional categories of characteristics. For example, a gene target, a method of action (MOA) between the test item and the target, a shape of the compound, a chemical structure of the compound, a family or classification of the test item, a phase, and/or any other basis for aggregation of the test items may be optionally selectable by a user.

As shown in the example of FIG. 6, each characteristic of the selected category is identified texturally and is associated with a stacked bar chart visualization. For example, characteristic indicator 610 is associated with a bar chart including a test items results indicator 234a, juxtaposed with a total test items results indicator 236. In one embodiment, the selected test items results indicators 234 may be given in an absolute number (e.g., a total number of test items in a selected data set) and/or a ratio of hits to total test items (e.g., a fraction, a decimal, etc.). The selected test items results indicators 234 and the total test items results indicators 236 may be differentiated by some visual distinction, such as on color, shape, outline, highlighting, and/or other feature. As shown, the HDAC inhibitor MOA 242 has been selected to indicate that 23 compounds of a selected data set (e.g., a cohorted data set) of a total 36 compounds in all of the selected data sets are associated with a HDAC inhibitor MOA.

FIG. 7 shows another aspect of an example graphical user interface 700 that allows a user to see a detail view of one or more aspects of a selected characteristic. As shown, selection of data set indicator 232 causes a variety of characteristic detail indicators 258 associated with the cohorted data set to be displayed. Each of the characteristic detail indicators 258 can correspond to respective characteristics, such as those described herein. A selected characteristic detail 262 shows, for example, a name, structure, phase, identification (e.g., NCGC ID), gene target, and/or a method of action of the selected characteristic. In this case, the characteristic may represent a class of compounds that a user may be interested in researching further. In other implementations, other data regarding the test items may be displayed, and the data may be obtained from one or more local and/or remotes data bases.

Figure 8:
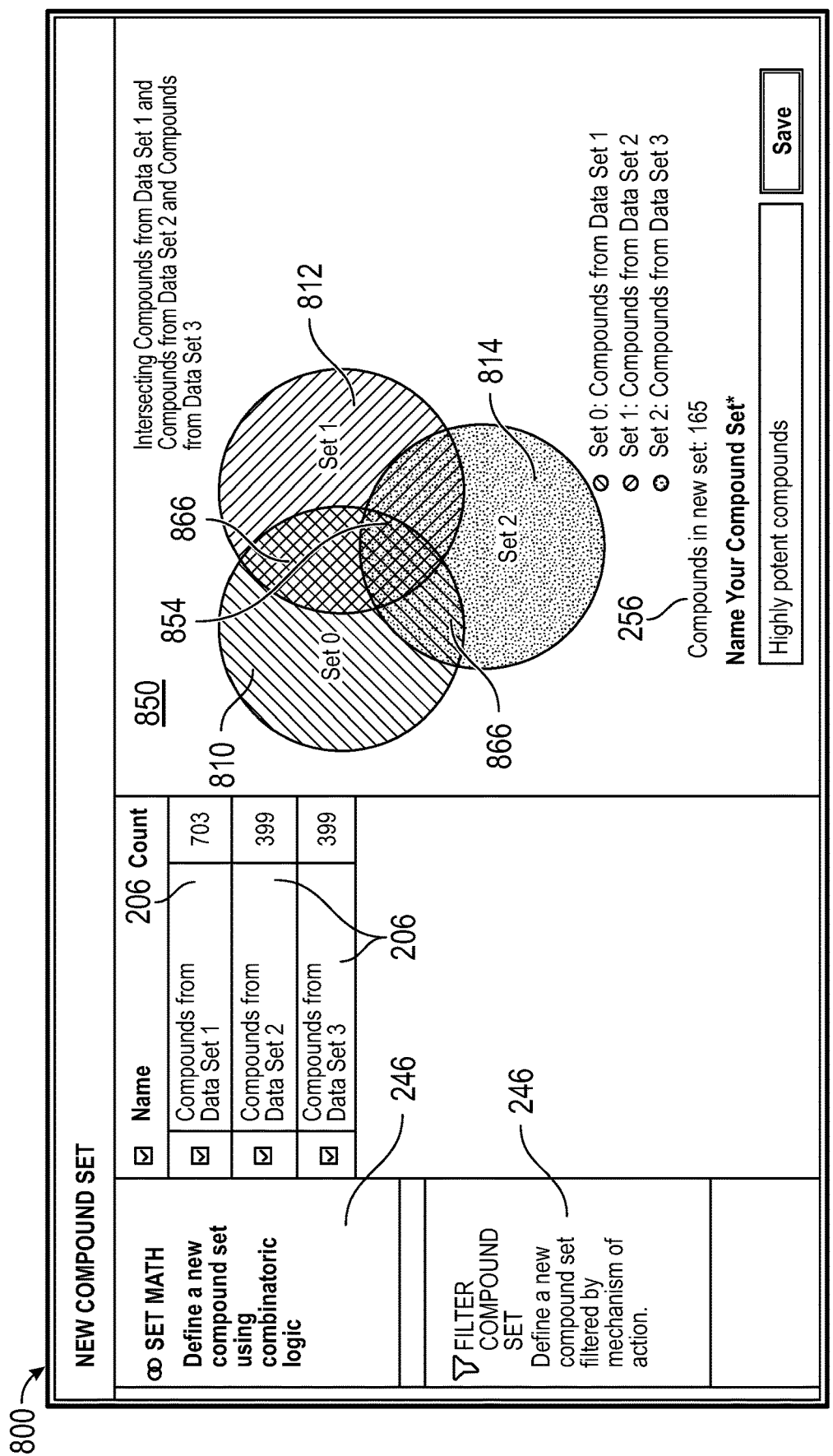
FIG. 8 shows an example graphical user interface where three data sets have been cohorted according to one embodiment.

FIG. 8 shows an example graphical user interface 800 where three data sets have been cohorted. As shown, three data set indicators 810, 812, 814 represent data sets that have been cohorted and are displayed in a Venn diagram within the matching test items analysis interface 850. The matching test items analysis interface 850 also includes a matching test items indicator 854, and/or intermediate matched test items indicators 866. In the example of FIG. 8, the intermediate matched test items indicators 866 indicate test items that are included in each of two data sets, but not as to all three of the data sets. By contrast, the matching test items indicator 854 refers to the cohorted test items that are hits for each of the three target data sets (or filtered data sets). As in FIG. 5, a matching test items results indicator 256 allows a user to see a total number of hits (e.g., corresponding to the matching test items indicator 854 and/or to one or more of the intermediate matched test items indicators 866). A selected set of hits (e.g., the hits corresponding to the matching test items indicator 854) may be saved as a new data set (e.g., in the experimental data store 150 of FIG. 1) for further analysis.

As noted above, the graphical user interface 800 can allow further analysis to be done on the new data set. The analysis type selectors 246 may allow a user to select the "filter compound set" selector. Like in FIG. 6, a category of characteristics may be selected to cause display of multiple characteristics in that category and corresponding test items in a cohorted data set and total test items visualization for each of the characteristics.

Once a new data set has been created by the user and/or by the analysis system 126, the new data set can be transmitted (or otherwise made accessible) to another computer, such as the sensor engineering 114, which may be in control and/or communication with sensors and/or robotic actuators for the creation of novel data sets by reacting new and/or additional test items (e.g., compounds) with new and/or additional targets (e.g., cancer cells). The data can be used to update an experiment configuration (e.g., time of day, dosage, etc.). This process can create a cycle of investigation, such as is indicated in FIG. 1.

Figure 9:
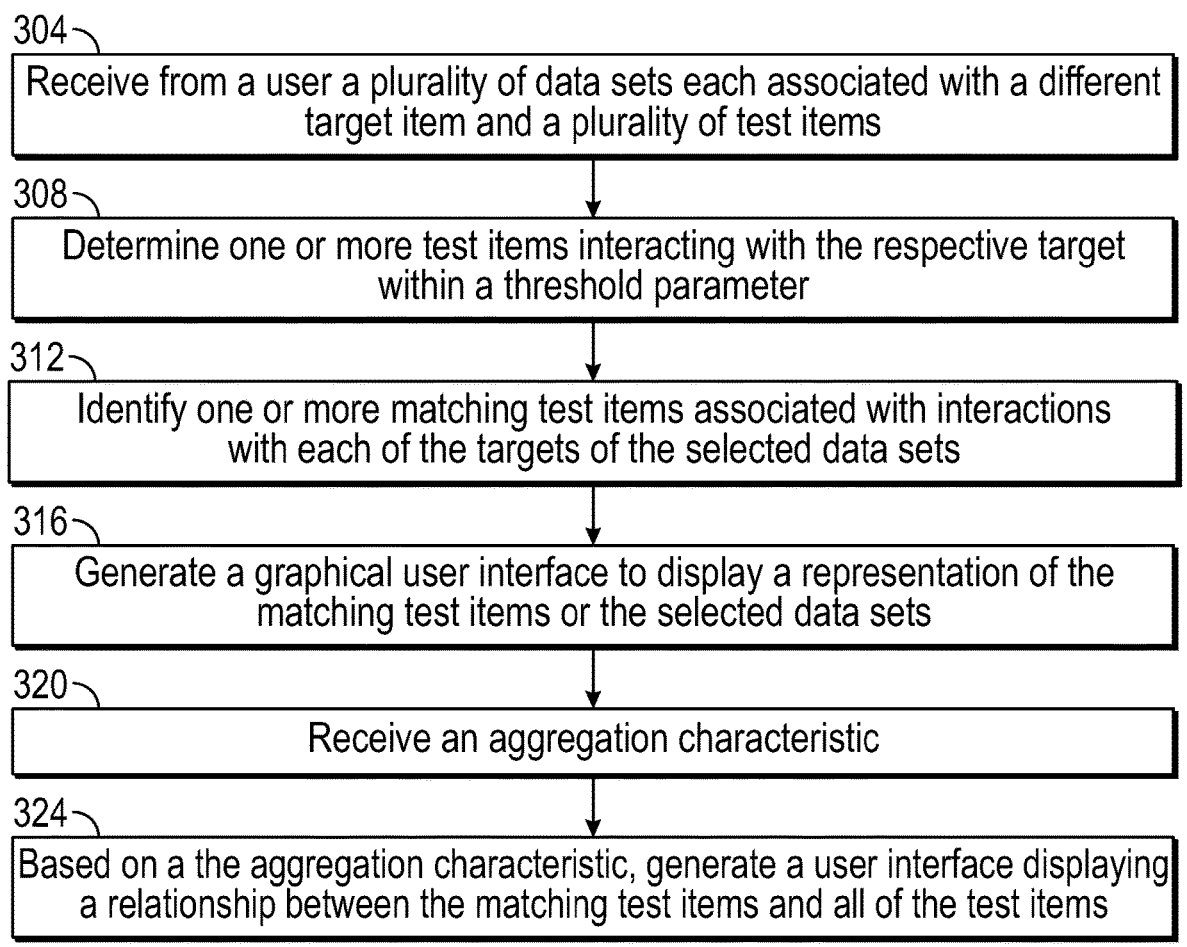
FIG. 9 shows an example method using an analysis system that may be implemented on a computer according to one embodiment.

FIG. 9 is a flowchart illustrating one embodiment of an example method that may be implemented on a computer. Depending on the embodiment, the method of FIG. 9 may include fewer or additional blocks and the blocks may be performed in an order that is different than illustrated.

Beginning at block 304, an analysis system, for example, receives from a user a plurality of data sets each associated with a different target item and a plurality of test items. At block 308, the analysis system determines one or more of the test items interacting with the respective target within a threshold parameter. For example, one or more filters may be applied through interactions of the user with visualizations of the data sets according to one or more measurement metrics. In some embodiments, the analysis system identifies one or more matching test items associated with interactions with each of the targets of the selected data sets, such as via a visualization of overlapping hits from multiple experiments. The matching test items may be test items that responded and/or reacted to each of the targets.

At block 316, the analysis system generates a graphical user interface to display a representation of the matching test items or the selected data sets. The representation can include a Venn diagram, a histogram, a bar chart, a line graph, or some other representation. At block 324 the analysis system receives (e.g., from a user) a filter selection for reducing a number of the matching test items to a filtered one or more test items. For example, the analysis system may allow a user to select a group of the matching test items. The matching test items may be cohorted or categorized based on a measurement metric and/or some other characteristic associated with the test items (e.g., a method of action, gene target, name, structure, phase, and/or some other criterion). A filter may include a user-selected section of the matching test items results. Other configurations are possible.

In some embodiments, at block 324, the method can include transmitting, based on a characteristic (such as a characteristic based on the filter), the filtered test items or the characteristic to a computer in communication with the one or more sensors for producing a new data set. Another computer (e.g., one associated with the sensor engineering 114 of FIG. 1) may be in communication with, for example, a local network 722 and/or the internet 728 via a communication interface 718 (see FIG. 10 below). The results of the new data set may be passed automatically to the other computer (e.g., the sensor engineering 114), which can accelerate the investigation of the selected compounds on new and/or additional targets. Additionally or alternatively, the results can modify an experiment configuration for a future experiment. This may support the discovery of new and effective medications for various human or animal ailments.

EXAMPLE EMBODIMENTS

Some example embodiments are provided below for illustration purposes. Additional or alternative examples are possible.

In a 1st example, a computer-implemented method for determining a cohort among a plurality of data sets obtained from one or more sensors comprises: accessing a plurality of data sets each associated with a different target item and a plurality of test items; receiving from a user a selection of a plurality of the data sets; for each of the selected data sets, determining one or more of the test items interacting with the respective target item within a threshold parameter; receiving, via a graphical user interface, a filter selection for reducing a number of test items to a filtered set of test items; identifying one or more matching test items of the filtered test items associated with interactions with each of the target items of the selected data sets; generating visualization data to display a representation of the matching test items, the selected data sets, or both; and identifying a characteristic of the matching test items.

In a 2nd example, the method of example 1, wherein the graphical user interface depicts information regarding the test items according to a measurement metric selected by the user.

In a 3rd example, the method of any of examples 1-2, further comprising exporting, based on the characteristic, the matching test items, the characteristic, or both to a computing system in communication with the one or more sensors for producing a new data set.

In a 4th example, the method of any of examples 1-3, wherein the visualization data includes visual objects representing each of the selected data sets and a matching items object representing the matching test items.

In a 5th example, the method of example 4, wherein the visualization data is configured to cause display of a Venn diagram, a bar graph, or both.

In a 6th example, the method of any of examples 1-5, wherein the plurality of data sets comprises representations of the interactions between chemical compounds and organic material.

In a 7th example, the method of any of examples 1-6, wherein identifying a characteristic of the matching test items comprises receiving from a user a method of interaction of the matching test items with the plurality of targets, a gene target of the matching test items, a threshold of interaction of the matching test items with the plurality of targets, a type of test item of the matching test items, a type of target of the plurality of targets that interacted with the matching test items, or any combination thereof.

In a 8th example, the method of example 7, wherein receiving from a user a filter selection comprises receiving a filter selection from a user, the filter selection resulting in a subsection of the matching test items, the filter selection comprising a selection of individual elements of the matching test items, a range of values of matching test items, or both.

In a 9th example, the method of any of examples 1-8, further comprising obtaining the plurality of data sets using the one or more sensors.

In a 10th example, the method of any of examples 1-9, wherein the plurality of data sets comprises experimental data.

In a 11th example, the method of any of examples 1-10, wherein the plurality of data sets comprises at least three data sets.

In a 12th example, the method of any of examples 1-11, wherein generating the graphical user interface further comprises indicating a relationship between the number of the matching test items and a number of total test items.

In a 13th example, a computing system for determining a cohort among a plurality of data sets obtained from one or more sensors, the computing system comprising: a computer readable storage medium having program instructions embodied therewith; and one or more processors configured to execute the program instructions to cause the computing system to: access a plurality of data sets each associated with a different target item and a plurality of test items; receive from a user a selection of a plurality of the data sets; for each of the selected data sets, determine one or more of the test items interacting with the respective target item within a threshold parameter; generate a graphical user interface comprising a representation of the test items, the selected data sets, or both, wherein the graphical user interface is configured to receive from a user a filter selection for reducing a number of the test items to a filtered set of test items; identify one or more matching test items of the plurality of test items associated with interactions with each of the target items of the selected data sets; receive, via the graphical user interface, a selection of a measurement metric for use in the graphical user interface; identify a characteristic of the matching test items; and based on the characteristic, exporting the filtered test items, the characteristic, or both to a second computing system.

In a 14th example, the computing system of example 13, wherein the graphical user interface depicts information regarding the test items according to a measurement metric selected by the user.

In a 15th example, the computing system of any of examples 13-14, wherein the second computing system is in communication with the one or more sensors for producing a new data set.

In a 16th example, the computing system of any of examples 13-15, wherein the one or more processors are further configured to execute the program instructions to update the graphical user interface to display visual objects representing each of the data sets and a cross section of the test items that interacted with each of the plurality of targets, the visual objects comprising a Venn diagram, a bar graph, or both.

In a 17th example, the computing system of any of examples 13-16, wherein the one or more processors are further configured to execute the program instructions to cause the system to receive from a user a method of interaction of the matching test items with the plurality of targets, a gene target of the matching test items, a threshold of interaction of the matching test items with the plurality of targets, or any combination thereof.

In a 18th example, the computing system of any of examples 13-17, wherein the one or more processors are further configured to execute the program instructions to cause the system to receive from a user a filter selection, the filter selection resulting in a subsection of the matching test items, the filter selection comprising a selection of individual elements of the matching test items, a range of values of the matching test items, or both.

In a 19th example, the computing system of any of examples 13-18, wherein the one or more processors are further configured to execute the program instructions to cause the system to indicate a relationship between the number of the matching test items and a number of total test items.

In a 20th example, the computing system of any of examples 13-19, wherein the plurality of data sets comprises at least three data sets.

Additional Implementation Details

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 10:
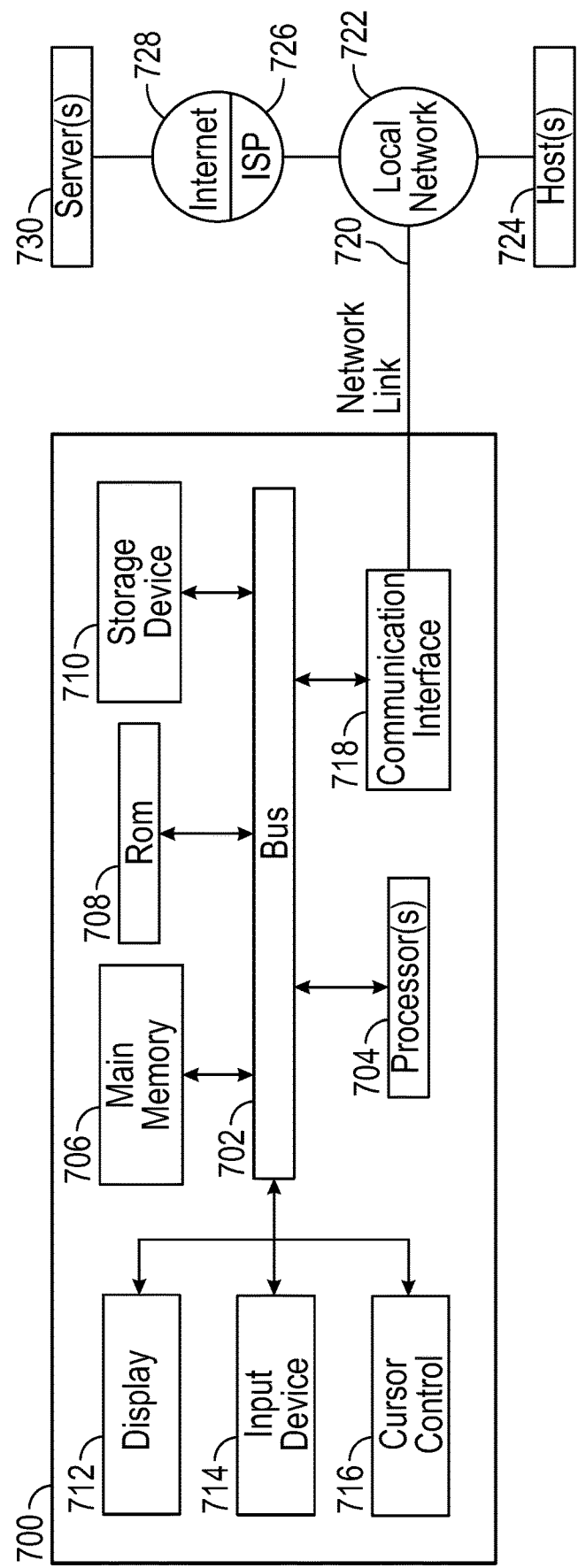
FIG. 10 is a block diagram that illustrates a computer system upon which various embodiments may be implemented according to one embodiment.

For example, FIG. 10 is a block diagram that illustrates a computer system 700 upon which various embodiments may be implemented. For example, the computer system 700 may be implemented as the analysis system 126 (FIG. 1) in some embodiments. Computer system 700 includes a bus 702 or other communication mechanism for communicating information, and a hardware processor, or multiple processors, 704 coupled with bus 702 for processing information. Hardware processor(s) 704 may be, for example, one or more general purpose microprocessors.

Computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

Computer system 700 may be coupled via bus 702 to a display 712, such as a cathode ray tube (CRT) or LCD display (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 700 may include a user interface module to implement a GUI that may be stored in a mass storage device as computer executable program instructions that are executed by the computing device(s). Computer system 700 may further, as described below, implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more computer readable program instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

Various forms of computer readable storage media may be involved in carrying one or more sequences of one or more computer readable program instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicated with a WAN). Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computer-implemented method for determining a cohort among a plurality of data sets obtained from one or more sensors, the method comprising:

accessing a plurality of data sets each associated with a different target item and a plurality of test items;

receiving from a user a selection of the plurality of the data sets;

for each of the selected data sets, determining one or more of the test items chemically interacting with the respective target item within a threshold parameter;

identifying one or more matching test items that interact with each of the respective target items within the corresponding threshold parameter;

generating visualization data to display a representation of the matching test items, the selected data sets, or both, the visualization data displaying a graphical distribution representation of the determined test items;

receiving, via a graphical user interface, a filter selection for reducing a number of the determined test items to a filtered set of test items, wherein the filter selection comprises receiving a drag selection across the graphical distribution representation;
updating the visualization data;
identifying a characteristic common to the matching test items in how each of the matching test items chemically interacts with the respective target items;
exporting, based on the characteristic, the matching test items, the characteristic, or both to a computing system; and
based on the matching test items and on the characteristic, generating, in conjunction with the one or more sensors, a new data set at the computing system.

2. The method of claim 1, wherein the graphical user interface depicts information regarding the test items according to a measurement metric selected by the user.

3. The method of claim 1, wherein the visualization data includes visual objects representing each of the selected data sets and a matching items object representing the matching test items.

4. The method of claim 3, wherein the visualization data is configured to cause display of a Venn diagram, a bar graph, or both.

5. The method of claim 1, wherein the plurality of data sets comprises representations of the interactions between chemical compounds and organic material.

6. The method of claim 1, wherein identifying the characteristic of the matching test items comprises receiving from the user one or more of a method of interaction of the matching test items with the plurality of targets, a gene target of the matching test items, a threshold of interaction of the matching test items with the plurality of targets, a type of test item of the matching test items, a type of target of the plurality of targets that interacted with the matching test items, or any combination thereof.

7. The method of claim 6, wherein the filter selection comprises a selection of individual elements of the matching test items, a range of values of matching test items, or both.

8. The method of claim 1, further comprising obtaining the plurality of data sets using the one or more sensors.

9. The method of claim 1, wherein the plurality of data sets comprises experimental data.

10. The method of claim 1, wherein the plurality of data sets comprises at least three data sets.

11. The method of claim 1, wherein generating the graphical user interface further comprises indicating a relationship between the number of the matching test items and a number of total test items.

12. A computing system for determining a cohort among a plurality of data sets obtained from one or more sensors, the computing system comprising:
a computer readable storage medium having program instructions embodied therewith; and
one or more processors configured to execute the program instructions to cause the computing system to:
access a plurality of data sets each associated with a different target item and a plurality of test items;
receive from a user a selection of the plurality of the data sets;
for each of the selected data sets, determine one or more of the test items chemically interacting with the respective target item within a threshold parameter;
generate a graphical user interface comprising a representation of the test items, the selected data sets, or both, the graphical user interface displaying a graphical distribution representation of the determined test items, wherein the graphical user interface is configured to receive from the user a filter selection for reducing a number of the determined test items to a filtered set of test items, the filter selection comprises receiving a drag selection across the graphical distribution representation;
identify one or more matching test items that interact with each of the respective target items within the corresponding threshold parameter;
updating the graphical user interface;
receive, via the graphical user interface, a selection of a measurement metric for use in the graphical user interface;
identify a characteristic common to the matching test items in how each of the matching test items chemically interacts with the respective target items;
based on the characteristic, exporting the filtered test items, the characteristic, or both to a second computing system; and
based on the exported filtered test items, generate, in conjunction with the one or more sensors, a new data set at the second computing system.

13. The computing system of claim 12, wherein the graphical user interface depicts information regarding the test items according to a measurement metric selected by the user.

14. The computing system of claim 12, wherein the second computing system is in communication with the one or more sensors for producing a new data set.

15. The computing system of claim 12, wherein the one or more processors are further configured to execute the program instructions to update the graphical user interface to display visual objects representing each of the data sets and a cross section of the test items that interacted with each of the plurality of targets, the visual objects comprising a Venn diagram, a bar graph, or both.

16. The computing system of claim 12, wherein the one or more processors are further configured to execute the program instructions to cause the system to receive from a user a method of interaction of the matching test items with the plurality of targets, a gene target of the matching test items, a threshold of interaction of the matching test items with the plurality of targets, or any combination thereof.

17. The computing system of claim 12, wherein the one or more processors are further configured to execute the program instructions to cause the system to receive from a user a filter selection, the filter selection resulting in a subsection of the matching test items, the filter selection comprising a selection of individual elements of the matching test items, a range of values of the matching test items, or both.

18. The computing system of claim 12, wherein the one or more processors are further configured to execute the program instructions to cause the system to indicate a relationship between the number of the matching test items and a number of total test items.

19. The computing system of claim 12, wherein the plurality of data sets comprises at least three data sets.

* * * * *